UNITED STATES PATENT OFFICE.

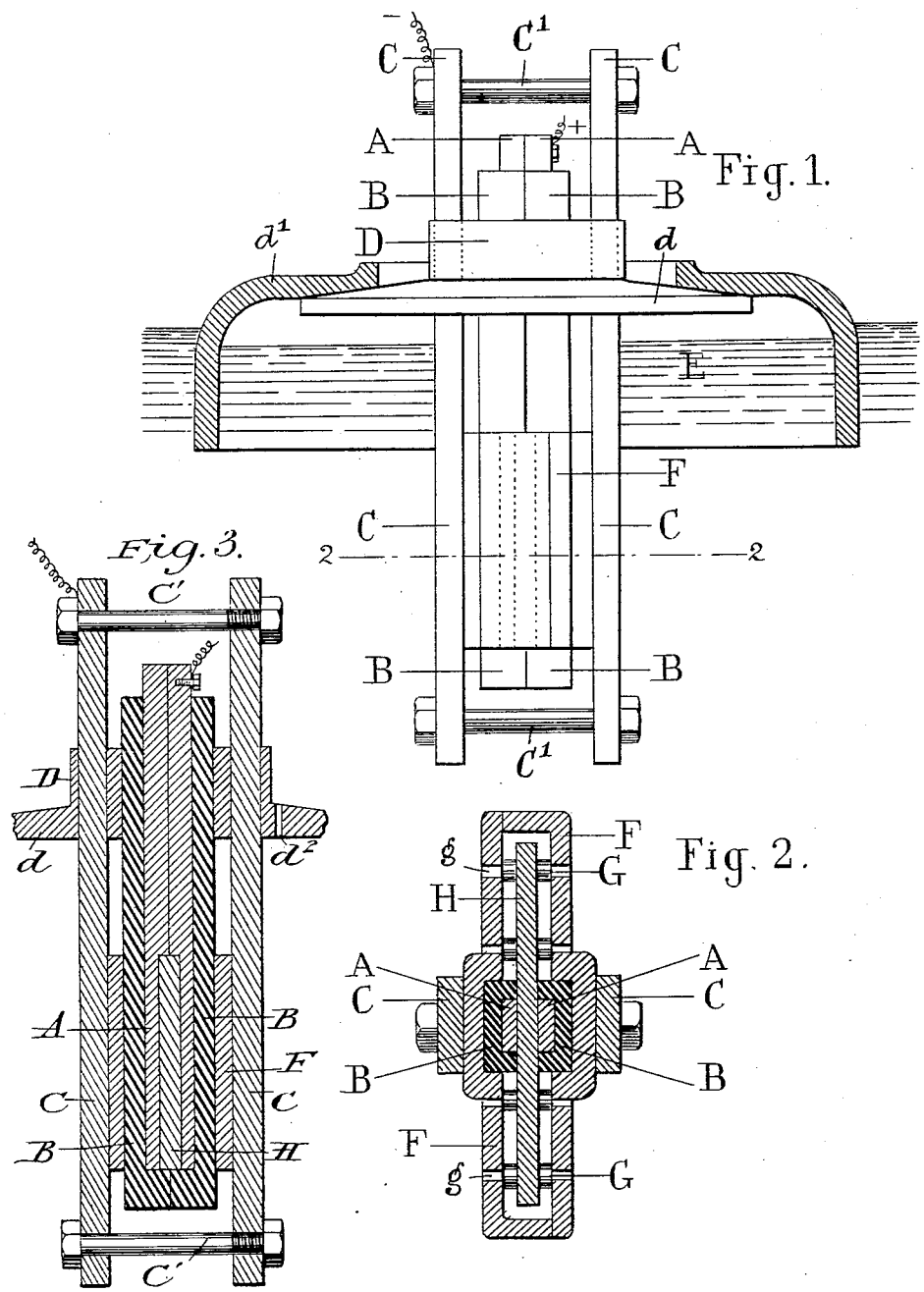

ANTHELME ERNEST WILLEM BOUCHER, OF PRILLY, SWITZERLAND.

APPARATUS FOR ELECTROLYSIS.

SPECIFICATION forming part of Letters Patent No. 587,696, dated August 10, 1897.

Application filed August 13, 1896. Serial No. 602,619. (No model.)

*To all whom it may concern:*

Be it known that I, ANTHELME ERNEST WILLEM BOUCHER, a citizen of Switzerland, residing at Prilly, Switzerland, have invented certain new and useful Improvements in an Apparatus for Electrolysis, of which the following is a specification.

My invention has particular relation to the construction and arrangement of electrodes of apparatus for effecting electrolysis of especially chlorids into chlorates at a temperature below 212° Fahrenheit in water or a dilute solution.

Primarily my invention consists in the use of an electrode having combined in one structure a positive and negative element suitably insulated from one another—that is, the part of the positive element which enters the electrolyte or liquid being composed of a material which is not subject to attack by the liquid or electrolyte, such as gold in leaf form, platinum, carbon, or the like, and suitably united to an upwardly-projecting bar of baser material, as copper, iron, or the like, the said bar being insulated from the electrolyte or liquid.

My invention, stated in general terms, consists of an apparatus for electrolysis especially designed for the transforming of chlorids into chlorates in substantially the manner hereinafter described and claimed.

The nature and scope of my invention will be more fully understood from the following description, taken in connection with the accompanying drawings, forming part hereof, in which—

Figure 1 is an end elevation, partly sectioned, of an apparatus for electrolysis embodying features of my invention. Fig. 2 is a horizontal section on the line 2 2 of Fig. 1, and Fig. 3 is a vertical central section of Fig. 1.

Referring to the drawings, A A represent the upper bars of the positive element, which, by preference, are composed of a base metal.

B B are the insulation-strips at the top and bottom of the bars A A to prevent the electrolyte or liquid E from contacting with said bars A A.

The bars C C represent the negative bars, which, by means of bolts C' C', hold in position the L-shaped active portion F of the negative element. The bars C C and the active portions F of the negative element may be of brass, iron, or other base metal.

The bars A A of the positive element are suitably connected to or support a leaf or plate H of non-oxidizable metal, as gold, platinum, or carbon. This plate H is the only portion of the positive element which is immersed in the electrolyte or liquid E. The plate H is surrounded by the portions F of the negative element, which when in position form, preferably, a rectangular open-ended box or tube, the walls of which are perforated, as at $g$, and the plate H is insulated from the negative element F by means of small perforated disks, rings, or washers G, of rubber or other suitable material, the perforations of which disks register, respectively, with the several perforations in the walls of the negative element. The disks or washers G serve to maintain the plate H and portions F at an invariable distance from each other. The perforations in the disks G and the walls F permit of the ready access of the electrolyte to and through the negative element and to the plate H.

Upon the upper end of the electrode is suitably fastened a collar D, having a small vertically-disposed opening $d^2$, as illustrated in Fig. 3, and a horizontal flange $d$. This flange $d$ supports a downwardly-extending cup-shaped hood $d'$, forming a gas-receiver for the electrode when the same is submerged in the electrolyte. The electrolyte by preference is a solution of a chlorid. When the electrodes are immersed in a liquid, as water, the reaction which takes place is as follows: The water is decomposed, the oxygen going into the positive pole or terminal A and the hydrogen to the negative pole or terminal F; but if the water contains a solution of alkaline chlorids, the oxygen is evolved at the positive pole or terminal and goes to the chlorid, while the hydrogen is evolved at the negative pole or terminal F and is collected under the bell E and may be permitted to escape through a pipe. (Not shown.) The current passes from the plate H through the electrolyte of the bell E to the cathode F and then to the bars C, one or both of which constitute the negative terminal of the electrode. This electrode is designed particularly for use in connection with cold electrolytes—that is, where the electrolyte or liquid is normally of a temperature below 212° Fahrenheit, especially in a dilute solution.

The heat necessary for the production of chlorates is maintained in any suitable or preferred manner—for example, by a coil projecting through the apparatus, and through which is permitted to flow hot water or vapor. Such an arrangement as above explained has not been shown in the drawings, but, however, will be readily understood by those skilled in the art to which my invention appertains without further explanation or detailed illustration thereof.

Having thus described the nature and objects of my invention, what I claim as new, and desire to secure by Letters Patent, is—

1. An apparatus for electrolysis, consisting of a positive plate or electrode, one portion of which is non-oxidizable and adapted to be immersed in an electrolyte or liquid, and the other portion of oxidizable material constituting the positive terminal of the electrode, an insulating material surrounding the oxidizable portion of the positive plate and insulating the same from the electrolyte or liquid, a negative electrode consisting of two plates and together forming a box open at the top and bottom and adapted to be immersed in said electrolyte and to completely surround the non-oxidizable portion of the positive plate and suitably insulated therefrom, and a bar or bars adapted to support the negative electrode and constituting the negative terminal of the electrode, substantially as and for the purposes described.

2. An apparatus for electrolysis, consisting of a positive plate of non-oxidizable material, two bars of oxidizable material supporting said plate, material adapted to insulate said bars from the electrolyte, two negative plates inclosing the non-oxidizable plate and insulated therefrom, each of said negative plates being perforated to permit of the passage of the electrolyte, and a hood adapted to inclose the said plates to collect the gases arising therefrom, substantially as and for the purposes described.

In testimony whereof I affix my signature in presence of two witnesses.

ANTHELME ERNEST WILLEM BOUCHER.

Witnesses:
G. DE MESTRAL,
EDWARD P. MACLEAN.